(12) United States Patent
Lin et al.

(10) Patent No.: US 10,209,549 B2
(45) Date of Patent: Feb. 19, 2019

(54) TOUCH PANEL AND METHOD FOR MANUFACTURING THE SAME

(71) Applicant: AU Optronics Corporation, Hsin-Chu (TW)

(72) Inventors: Wei-Lin Lin, Hsin-Chu (TW); Yu-Feng Chien, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 28 days.

(21) Appl. No.: 15/392,288

(22) Filed: Dec. 28, 2016

(65) Prior Publication Data
US 2018/0004027 A1 Jan. 4, 2018

(30) Foreign Application Priority Data

Jul. 1, 2016 (TW) .............................. 105120951 A

(51) Int. Cl.
| | | |
|---|---|---|
| *G02F 1/1333* | (2006.01) | |
| *G02F 1/1362* | (2006.01) | |
| *G02F 1/1335* | (2006.01) | |
| *G02F 1/1343* | (2006.01) | |
| *G06F 3/041* | (2006.01) | |

(Continued)

(52) U.S. Cl.
CPC .... *G02F 1/13338* (2013.01); *G02F 1/133345* (2013.01); *G02F 1/133516* (2013.01); *G02F 1/134309* (2013.01); *G06F 3/044* (2013.01); *G06F 3/0412* (2013.01); *G02F 1/1362* (2013.01); *G02F 2001/13606* (2013.01); *G02F 2001/136218* (2013.01);

(Continued)

(58) Field of Classification Search
CPC ......... G02F 2001/133334; G02F 2001/136218
See application file for complete search history.

(56) References Cited

U.S. PATENT DOCUMENTS 9,164,636 B2  10/2015 Kuo et al.
2007/0242193 A1* 10/2007 Shin .................. G02F 1/133512
                                                         349/106

(Continued)

FOREIGN PATENT DOCUMENTS

CN   201477560 U   5/2010
CN   102043555 A   5/2011

OTHER PUBLICATIONS

The State Intellectual Property Office of the People's Republic of China, "Office Action", dated Jul. 31, 2018.

*Primary Examiner* — Alexander Gross
(74) *Attorney, Agent, or Firm* — WPAT, PC

(57) ABSTRACT

A method for manufacturing a touch panel includes the following steps. A plurality of first sensing electrodes and a plurality of second sensing electrodes are formed on the first substrate. A first insulator layer is formed to cover the first sensing electrodes and the second sensing electrodes. Holes are formed in the first insulator layer, in which a portion of the first sensing electrodes is exposed through the holes. A conductive layer is formed on the first insulator layer and in the holes. The conductive layer is patterned to form a bridge electrode and a shield electrode. The bridge electrode is electrically connected to the first sensing electrodes through the holes. A vertical projection of the shield electrode on the first substrate at least overlaps with a vertical projection of at least one of the first sensing electrodes and the second sensing electrodes on the first substrate.

5 Claims, 15 Drawing Sheets

(51) Int. Cl.
*G06F 3/044* (2006.01)
*G02F 1/136* (2006.01)

(52) U.S. Cl.
CPC .............. *G06F 2203/04103* (2013.01); *G06F 2203/04107* (2013.01); *G06F 2203/04111* (2013.01)

(56) References Cited

U.S. PATENT DOCUMENTS

| | | | |
|---|---|---|---|
| 2011/0090159 A1* | 4/2011 | Kurashima | G06F 3/044 345/173 |
| 2015/0091866 A1 | 4/2015 | Deng | |
| 2015/0185917 A1* | 7/2015 | Song | G06F 3/044 345/174 |
| 2016/0048248 A1* | 2/2016 | Na | G06F 3/044 345/174 |
| 2016/0179254 A1 | 6/2016 | Kurashima | |
| 2016/0224147 A1 | 8/2016 | Ding | |

\* cited by examiner

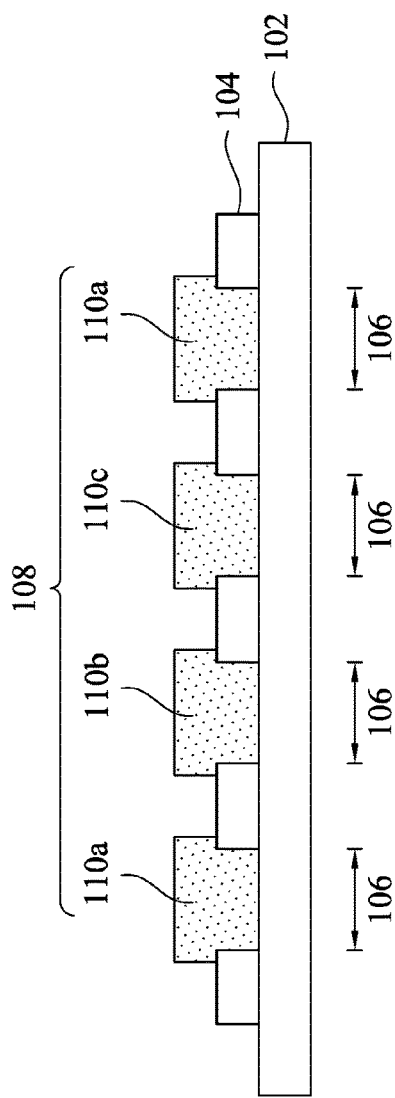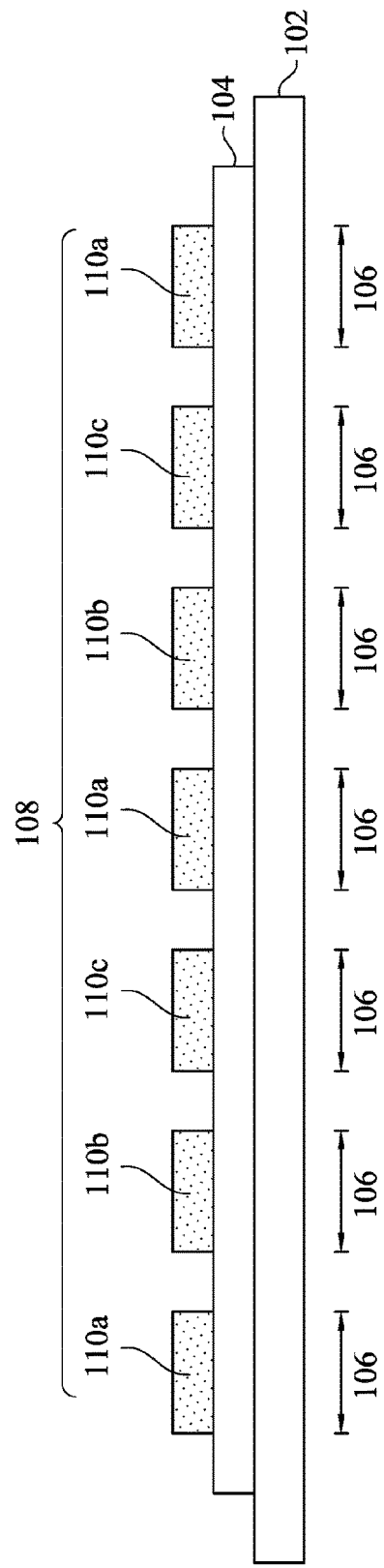

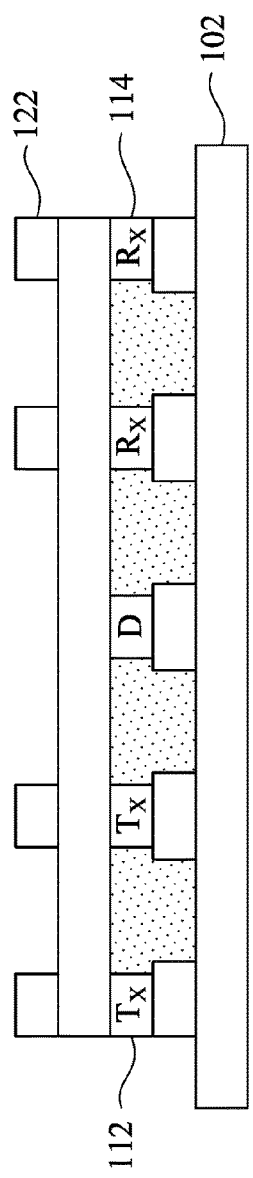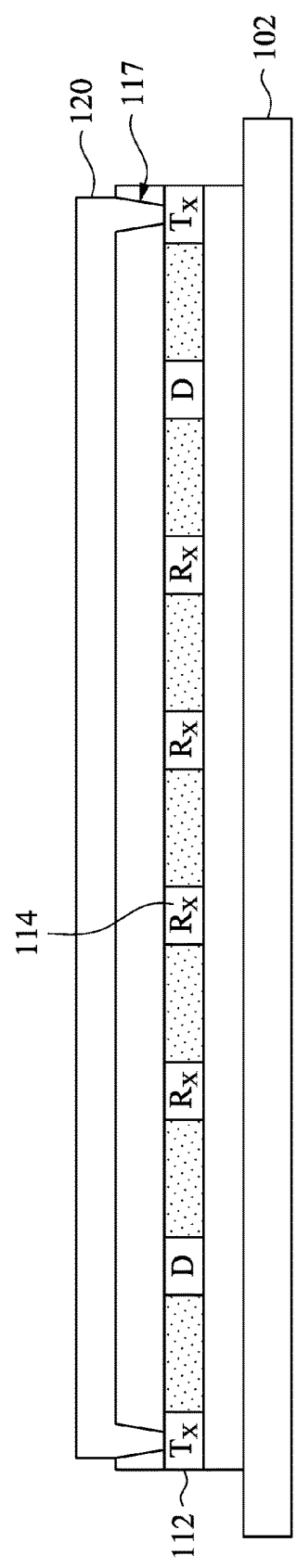

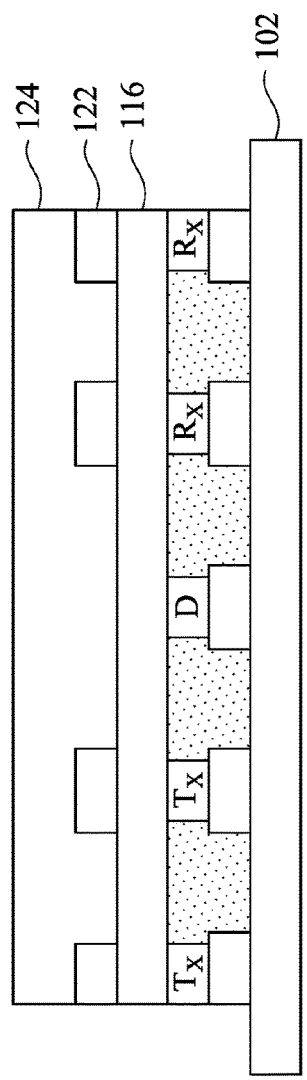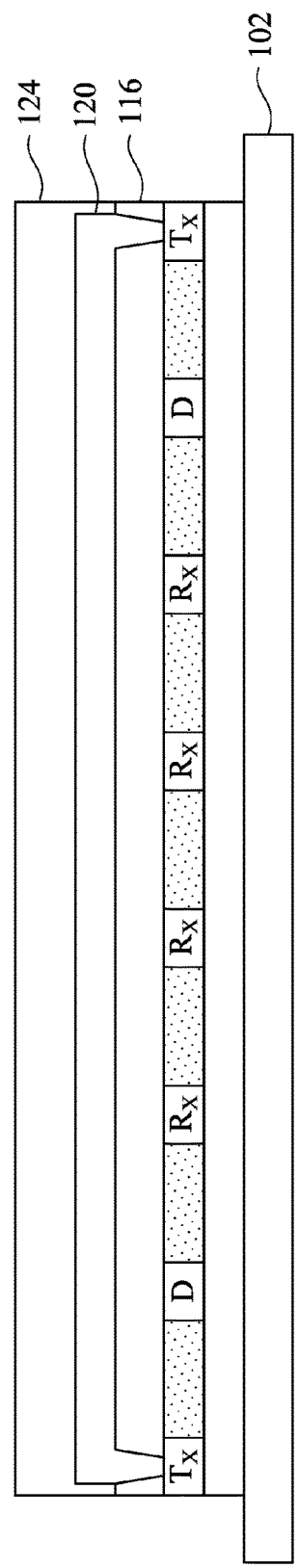

TOUCH PANEL AND METHOD FOR MANUFACTURING THE SAME

BACKGROUND

Technical Field

The present invention relates to a touch panel and a method for manufacturing the same.

Related Art

In various electronic products of household appliances, liquid crystal displays with thin film transistors (TFTs) are widely used, where a TFT array substrate is provided with a plurality of TFTs arranged as an array, and pixel electrodes arranged corresponding to the TFTs. Touch panels with liquid crystal displays are emerged with a demand of a consumer market, and include two types, external touch panel and embedded touch panel. The embedded touch panel in the two types of touch panels has been a mainstream product of the market.

However, in an embedded touch panel, for adjacent structural layers with different electric signals, the different structural layers may interact with each other, leading to an unexpected phenomenon. For example, parasitic capacitance may be generated between the structural layers with different electrical signals so that correct signals may not be generated. Further, when the structural layers affect each other, frame quality of the liquid crystal display may be reduced, and a frame of the liquid crystal display may have a problem of uneven brightness.

SUMMARY

One embodiment of the present invention provides a touch panel, including: a first substrate, a second substrate, sensing electrodes, and a shield electrode, where the sensing electrodes and the shield electrode are located between the first substrate and the second substrate. In a structure of the touch panel, the shield electrode may be located between the sensing electrodes and the second substrate, and a vertical projection of the shield electrode on the first substrate at least partially overlaps with vertical projections of the sensing electrodes on the first substrate, such that the shield electrode can prevent the sensing electrodes from being subjected to interference from a side of the second substrate. Besides, by means of the method for manufacturing a touch panel of one embodiment of the present invention, a manufacturing process of a touch panel does not need an additional photomask manufacturing process for the manufacturing of a shield electrode, and therefore, the shield electrode is formed in the touch panel without increasing complexity of the manufacturing process.

One embodiment of the present invention provides a method for manufacturing a touch panel, including the following steps: forming a plurality of first sensing electrodes and a plurality of second sensing electrodes on a first substrate; forming a first insulator layer to cover the first sensing electrodes and the second sensing electrodes; forming a plurality of holes in the first insulator layer, in which at least a portion of the first sensing electrodes is exposed through the holes; forming a conductive layer on the first insulator layer and in the holes; and patterning the conductive layer to form a bridge electrode and a shield electrode, where the bridge electrode is electrically connected to the first sensing electrodes through the holes, and a vertical projection of the shield electrode on the first substrate at least partially overlaps with a vertical projection of at least one of the first sensing electrodes and the second sensing electrodes on the first substrate.

In at least one of the embodiments, the shield electrode is not electrically connected to the bridge electrode.

In at least one of the embodiments, the method for manufacturing a touch panel further includes the following steps: forming a second insulator layer to cover the bridge electrode and the shield electrode; forming an electrode layer on the second insulator layer; and forming at least one liquid crystal material between the electrode layer and a second substrate.

In at least one of the embodiments, the step of forming the second insulator layer includes forming a color resistance layer, where the color resistance layer at least covers the bridge electrode and the shield electrode to serve as the second insulator layer.

In at least one of the embodiments, the method for manufacturing a touch panel further includes forming at least one dummy electrode on the first substrate, where at least one of the first sensing electrodes and the second sensing electrodes is electrically insulated from the dummy electrode.

In at least one of the embodiments, the method for manufacturing a touch panel further includes forming a color resistance layer on the first substrate, where the step of forming the color resistance layer is before the step of forming the first sensing electrodes and the second sensing electrodes.

In at least one of the embodiments, the method for manufacturing a touch panel further includes forming a color resistance layer on the first substrate, where the step of forming the color resistance layer is after the step of forming the first sensing electrodes and the second sensing electrodes.

In at least one of the embodiments, the method for manufacturing a touch panel further includes forming a color resistance layer on the first substrate, where the step of forming the color resistance layer is after the step of patterning the conductive layer.

In at least one of the embodiments, the step of forming the first insulator layer includes forming a color resistance layer, where the color resistance layer at least covers the first sensing electrodes and the second sensing electrodes to serve as the first insulator layer.

At least one of the embodiments of the present invention provides a method for manufacturing a touch panel, including the following steps: forming a first sensing electrode on a first substrate; forming a first insulator layer, where the first insulator layer at least covers the first sensing electrode; forming a conductive layer on the first insulator layer; and patterning the conductive layer to form a second sensing electrode and a shield electrode, where a vertical projection of the shield electrode on the first substrate at least partially overlaps with a vertical projection of the first sensing electrode on the first substrate.

In at least one of the embodiments, the second sensing electrode is not electrically connected to the shield electrode.

At least one of the embodiments of the present invention provides a touch panel, including: a first substrate, first sensing electrodes, second sensing electrodes, a first insulator layer, a bridge electrode, and a shield electrode. The first sensing electrodes are disposed on the first substrate. The second sensing electrodes are disposed on the first substrate. The first insulator layer at least covers the first sensing electrodes and the second sensing electrodes, where the first insulator layer has a plurality of holes, and the holes expose at least a portion of the first sensing electrodes. The bridge electrode is disposed on the first insulator layer, and is electrically connected to the first sensing electrodes through the holes. The shield electrode is disposed on the first insulator layer, where a vertical projection of the shield electrode on the first substrate at least partially overlaps with a vertical projection of at least one of the first sensing electrodes and the second sensing electrodes on the first substrate, and the bridge electrode and the shield electrode are formed by a same film layer.

In at least one of the embodiments, a shape of each of the first sensing electrodes is different from a shape of each of the second sensing electrodes.

In at least one of the embodiments, a vertical projection of at least one of the first sensing electrodes and the second sensing electrodes on the second substrate is within a vertical projection of the shield electrode on the second substrate.

In at least one of the embodiments, the touch panel further includes a second insulator layer, an electrode layer, a liquid crystal layer, and a second substrate. The second insulator layer is disposed on the first insulator layer, and covers the bridge electrode and the shield electrode. The electrode layer is disposed on the second insulator layer. The liquid crystal layer is disposed on the electrode layer. The second substrate is disposed at one side of the first substrate, where the liquid crystal layer is located between the electrode layer and the second substrate.

At least one of the embodiments of the present invention provides a touch panel, including: a first substrate, first sensing electrodes, a first insulator layer, second sensing electrodes, and a shield electrode. The first sensing electrodes are disposed on the first substrate. The first insulator layer covers the first sensing electrodes. The second sensing electrodes are disposed on the first insulator layer. The shield electrode is disposed on the first insulator layer, where a vertical projection of the shield electrode on the first substrate at least partially overlaps with vertical projections of the first sensing electrodes on the first substrate, and the second sensing electrodes and the shield electrode are formed by a same film layer.

BRIEF DESCRIPTION OF THE DRAWINGS

FIG. 2A, FIG. 2C, FIG. 2E, FIG. 2G, FIG. 2I, and FIG. 2K show sectional views along line BB' of FIG. 1A of the touch panel of the first embodiment of the present invention at different steps of a manufacturing process;

FIG. 2B, FIG. 2D, FIG. 2F, FIG. 2H, FIG. 2J, and FIG. 2L show sectional views along line CC' of FIG. 1A of the touch panel of the first embodiment of the present invention at the different steps of the manufacturing process;

DETAILED DESCRIPTION

Figure 1A:
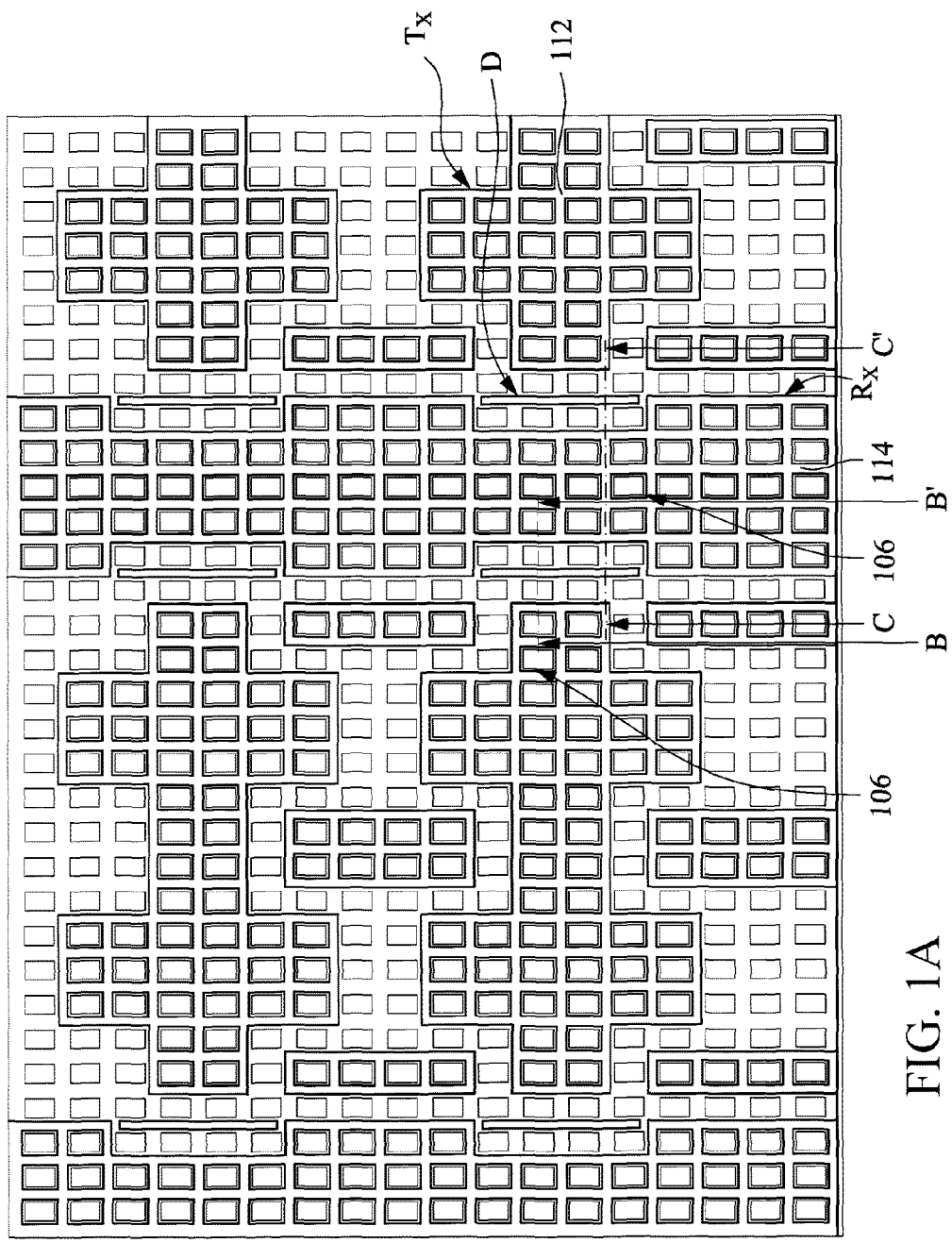
FIG. 1A shows a top view of first sensing electrodes and second sensing electrodes of a touch panel according to a first embodiment of the present invention.

Embodiments of the present invention are disclosed below with reference to drawings. To make the description clear, many practical details are described in the description below. However, it should be understood that the practical details shall not be used to limit the present invention. That is, in some embodiments of the present invention, the practical details are not necessary. Besides, in order to simplify the drawings, some conventional and common structures and elements are shown in the drawings in a simple schematic manner.

In a structure of a touch panel, when structural layers affect each other, image quality of a liquid crystal display may be affected. In view of that, an embodiment of the present invention provides a touch panel, including a first substrate, a second substrate, sensing electrodes, and a shield electrode, where the sensing electrodes and the shield electrode are located between the first substrate and the second substrate. In a structure of the touch panel, the shield electrode may be located between the sensing electrodes and the second substrate, and a vertical projection of the shield electrode on the first substrate at least partially overlaps with vertical projections of the sensing electrodes on the first substrate, such that the shield electrode can prevent the sensing electrodes from being subjected to interference from a side of the second substrate, and parasitic capacitance generated between the sensing electrodes and the second substrate may be reduced. Besides, by means of the method for manufacturing a touch panel of at least one of the embodiments of the present invention, a manufacturing process of a touch panel does not need an additional photomask manufacturing process for the manufacturing of a shield electrode, and therefore, the shield electrode is formed in the touch panel without increasing complexity of the manufacturing process.

Figure 1B:
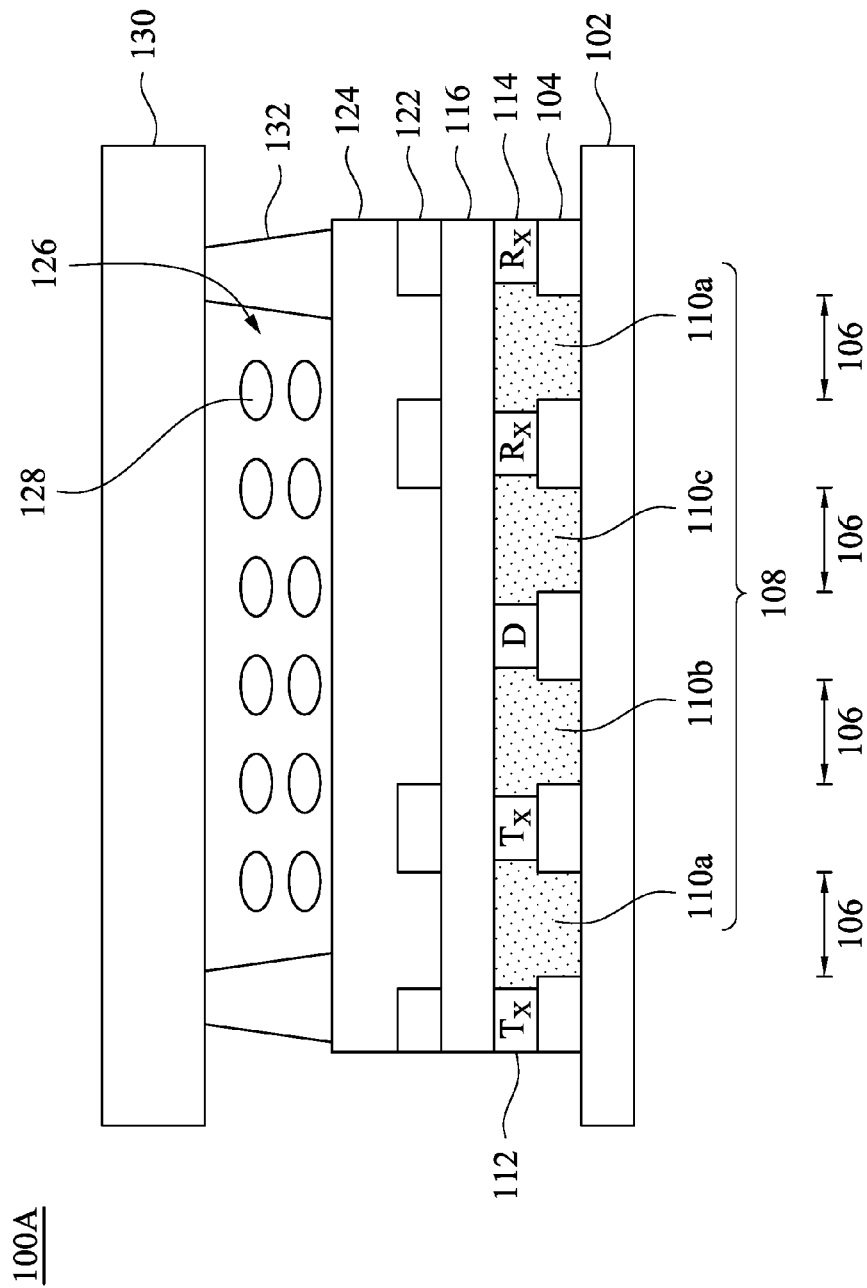
FIG. 1B shows a sectional view along line BB' of FIG. 1A.
Figure 1C:
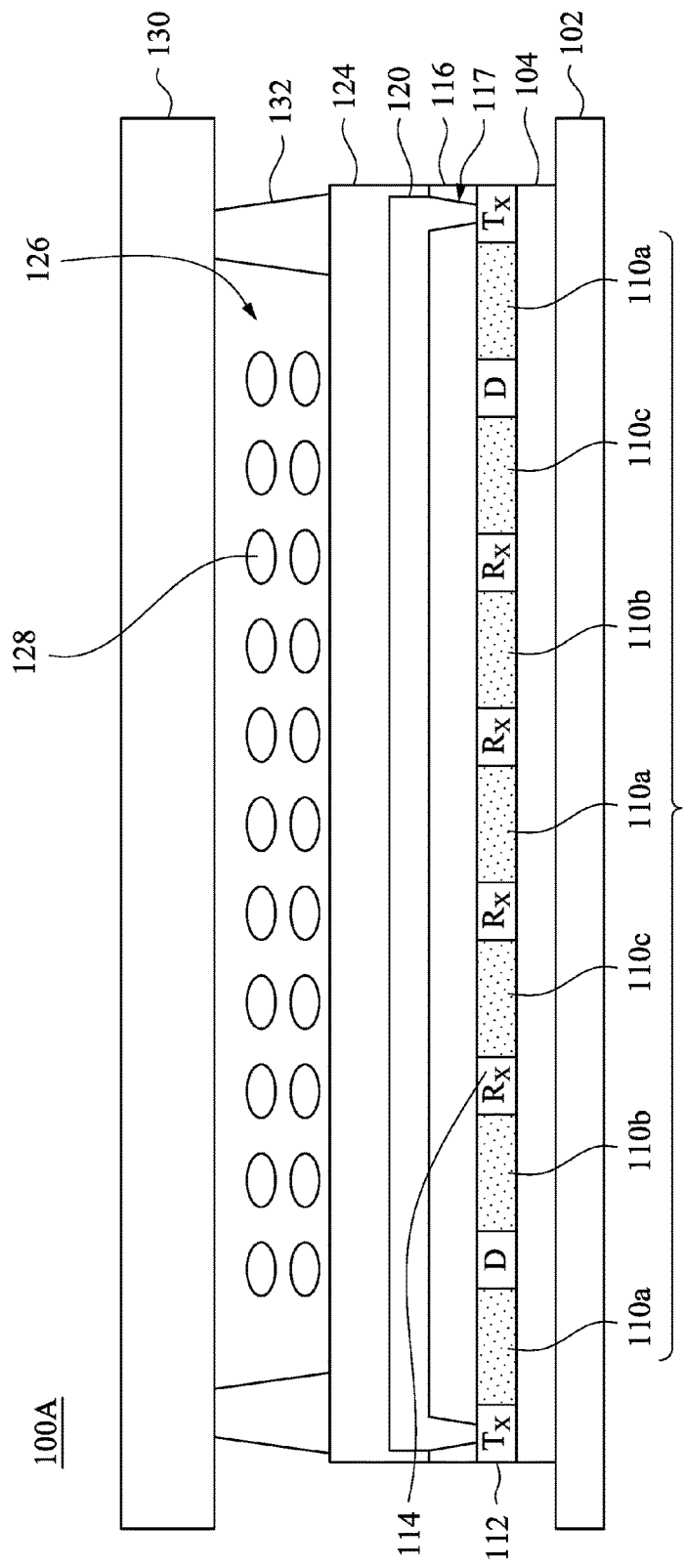
FIG. 1C shows a sectional view along line CC' of FIG. 1A.

Referring to FIG. 1A, FIG. 1B, and FIG. 1C, FIG. 1A shows a top view of first sensing electrodes 112 and second sensing electrodes 114 of a touch panel 100A according to a first embodiment of the present invention, FIG. 1B shows a sectional view along line BB' of FIG. 1A, and FIG. 1C shows a sectional view along line CC' of FIG. 1A. To enable the drawings not to be excessively complex, FIG. 1A merely shows the first sensing electrodes 112 and the second sensing electrodes 114 of the touch panel 100A, which are used to assist presentation of locations of structures shown in FIG. 1B and FIG. 1C. Besides, to facilitate the description, in the structures shown in FIG. 1B and FIG. 1C, a second substrate 130 is located above a first substrate 102, but the touch panel 100A of the present invention is not limited thereto. For example, the second substrate 130 may be located below the first substrate 102.

The touch panel 100A includes the first substrate 102, a light-shielding layer 104, a color resistance layer 108, first sensing electrodes 112, second sensing electrodes 114, a first insulator layer 116, bridge electrodes 120, shield electrodes 122, a second insulator layer 124, a liquid crystal layer 126, a spacer structure 132, and a second substrate 130. The second substrate 130 is disposed at one side of the first substrate 102, and may include a TFT array (not shown). The light-shielding layer 104, the color resistance layer 108, the first sensing electrodes 112, the second sensing electrodes 114, the first insulator layer 116, the bridge electrodes 120, the shield electrodes 122, the second insulator layer 124, the liquid crystal layer 126, and the spacer structure 132 are disposed between the first substrate 102 and the second substrate 130.

The light-shielding layer 104 is disposed on the first substrate 102, and may define pixel regions 106. The color resistance layer 108 is disposed on the first substrate 102, and includes a plurality of color resistors 110a, 110b, and 110c, where the color resistors 110a, 110b, and 110c are separately located at the corresponding pixel regions 106. The color resistors 110a, 110b, and 110c may be, for example, a red color resistor, a green color resistor, and a blue color resistor separately, but the present invention is not limited thereto.

The first sensing electrodes 112 and the second sensing electrodes 114 are disposed on the first substrate 102 and the light-shielding layer 104, where vertical projections of the first sensing electrodes 112 and the second sensing electrodes 114 on the first substrate 102 fall within a vertical projection of the light-shielding layer 104 on the first substrate 102. In this embodiment, the first sensing electrodes 112 and the second sensing electrodes 114 may be transmit electrodes Tx and receive electrodes Rx separately. However, in another embodiment, the first sensing electrodes 112 and the second sensing electrodes 114 may be receive electrodes and transmit electrodes respectively. Besides, the touch panel 100A may further include dummy electrodes D, the dummy electrodes D may be, for example, simultaneously formed together with the first sensing electrodes 112 and/or the second sensing electrodes 114, that is, the dummy electrodes D, the first sensing electrodes 112, and the second sensing electrodes 114 may be formed by patterning a same conductive layer, but the present invention is not limited thereto. The dummy electrodes D are disposed on the first substrate 102 and the light-shielding layer 104. By means of design of the dummy electrodes D, a visual effect of viewing a display frame has relatively good uniformity. The configuration of the dummy electrodes D shown in FIG. 1A is merely exemplary, a person of ordinary skill in the art may flexibly adjust the configuration of the dummy electrodes D according to actual requirements.

The first insulator layer 116 at least covers the first sensing electrodes 112 and the second sensing electrodes 114, where the first insulator layer 116 may have a plurality of holes 117, so as to expose at least a portion of the first sensing electrodes 112. The bridge electrodes 120 are disposed on the first insulator layer 116, and are electrically connected to the first sensing electrodes 112 through the holes by means of bridging. For example, each of the bridge electrodes 120 may cross at least one second sensing electrode 114, and two opposite ends of the bridge electrode 120 are respectively connected to two first sensing electrodes 112.

The shield electrodes 122 are disposed on the first insulator layer 116, where a vertical projection of each shield electrode 122 on the first substrate 102 at least partially overlaps with a vertical projection of at least one of the first sensing electrodes 112 and the second sensing electrodes 114 on the first substrate 102. Further, in this embodiment, a vertical projection of at least a portion of the first sensing electrodes 112 on the first substrate 102 falls within the vertical projections of the shield electrodes 122 on the first substrate 102, and a vertical projection of at least a portion of the second sensing electrodes 114 on the first substrate 102 also falls within the vertical projections of the shield electrodes 122 on the first substrate 102. Besides, a vertical projection of at least one of the first sensing electrodes 112 and the second sensing electrodes 114 on the second substrate 130 is also within the vertical projections of the shield electrodes 122 on the second substrate 130.

In another embodiment, a vertical projection of only a portion of a first sensing electrode 112 on a first substrate 102 falls within a vertical projection of a shield electrode 122 on the first substrate 102, and a vertical projection of only a portion of a second sensing electrode 114 on the first substrate 102 falls within the vertical projection of the shield electrode 122 on the first substrate 102. Likewise, alternatively, a vertical projection of only a portion of a first sensing electrode 112 on a second substrate 130 falls within a vertical projection of a shield electrode 122 on the second substrate 130, and a vertical projection of only a portion of a second sensing electrode 114 on the second substrate 130 falls within the vertical projection of the shield electrode 122 on the second substrate 130. Besides, the shield electrode 122 may be connected to a ground potential, so as to become a ground electrode.

With regard to a configuration relationship between the bridge electrodes 120 and the shield electrodes 122, the bridge electrodes 120 and the shield electrodes 122 may be formed by a same film layer, that is, the bridge electrodes 120 and the shield electrodes 122 may be made of a same material, and a thickness of a part of each bridge electrode 120 that is above the first insulator layer 116 may be the same as a thickness of each shield electrode 122. Besides, the bridge electrodes 120 and the shield electrodes 122 are at least in contact with a same surface of the first insulator layer 116. For example, the bridge electrodes 120 and the shield electrodes 122 are in contact with an upper surface of the first insulator layer 116, where the upper surfaces of the first insulator layers 116 are opposite to the first substrate 102. Further, lower surfaces of the bridge electrodes 120 and lower surfaces of the shield electrodes 122 are in contact with the upper surface of the first insulator layer 116, and the lower surfaces of the bridge electrodes 120 and the lower surfaces of the shield electrode 122 may be substantially located at a same horizontal plane.

The second insulator layer 124 is disposed on the first insulator layer 116, and covers the bridge electrodes 120 and the shield electrodes 122. The bridge electrodes 120 and the shield electrodes 122 may be formed by a same film layer, and therefore, the bridge electrodes 120 and the shield electrodes 122 are at least in contact with a same surface of the second insulator layer 124, for example, the bridge electrodes 120 and the shield electrodes 122 are in contact with a lower surface of the second insulator layer 124, where the lower surface of the second insulator layer 124 faces the first substrate 102. Further, upper surfaces of the bridge electrodes 120 and upper surfaces of the shield electrodes 122 are in contact with the second insulator layer 124, and the upper surfaces of the bridge electrodes 120 and the upper surfaces of the shield electrodes 122 may be substantially located at a same horizontal plane.

The liquid crystal layer 126 and the spacer structure 132 are disposed on the second insulator layer 124, and are located between the second insulator layer 124 and the second substrate 130, where the liquid crystal layer 126 includes a liquid crystal material 128.

By means of the foregoing configuration, the shield electrodes 122 are located between at least a portion of the first sensing electrodes 112 and the second substrate 130, and the vertical projection of the at least a portion of the first sensing electrodes 112 on the first substrate 102 falls within the vertical projections of the shield electrodes 122 on the first substrate 102, such that the shield electrodes 122 can prevent the first sensing electrodes 112 form being subjected to interference from a side of the second substrate 130. For example, the shield electrodes 122 can prevent the first sensing electrodes 112 from being subjected to interference of electrical signals of the TFT array of the second substrate 130, thereby improving correctness of touch signals.

Likewise, the shield electrode 122 is located between at least a portion of the second sensing electrodes 114 and the second substrate 130, and the vertical projection of the at least a portion of the second sensing electrodes 114 on the first substrate 102 falls within the vertical projections of the shield electrodes 122 on the first substrate 102, such that the shield electrodes 122 can prevent the second sensing electrodes 114 form being subjected to interference from a side of the second substrate 130, and/or reduce parasitic capacitance generated between the second sensing electrodes 114 and the second substrate 130.

On the other hand, the bridge electrodes 120 and the shield electrodes 122 may be formed by a same film layer, and therefore, the bridge electrodes 120 and the shield electrodes 122 may be manufactured in a same photomask manufacturing process, such that the manufacturing of the shield electrodes 122 does not increase complexity of the manufacturing process of the touch panel 100A. In other words, in the structure of the touch panel 100A of this embodiment, the shield electrodes 122 are formed in the touch panel 100A without increasing complexity of the manufacturing process. A manufacturing process of the touch panel 100A of this embodiment is further described below.

Referring to FIG. 2A to FIG. 2L, FIG. 2A, FIG. 2C, FIG. 2E, FIG. 2G, FIG. 2I, and FIG. 2K show sectional views along line BB' of FIG. 1A of the touch panel 100A of the first embodiment of the present invention at different stages of a manufacturing process, and FIG. 2B, FIG. 2D, FIG. 2F, FIG. 2H, FIG. 2J, and FIG. 2L show sectional views along line CC' of FIG. 1A of the touch panel of the first embodiment of the present invention at the different stages of the manufacturing process.

Figure 2C:
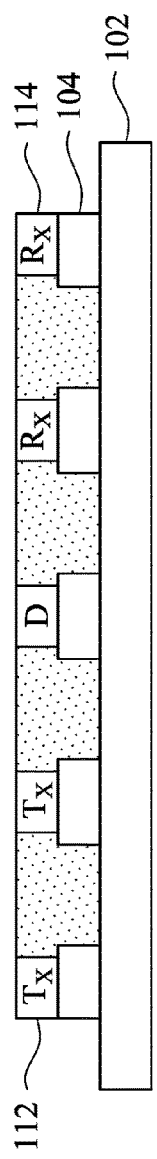
Figure 2D:
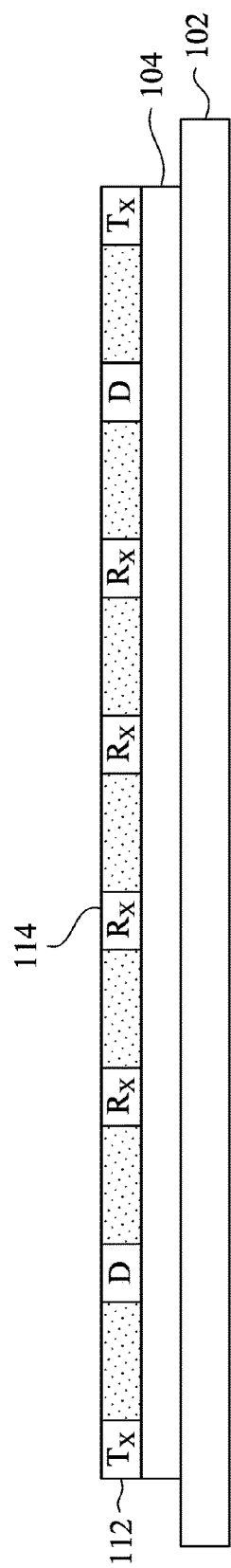

In FIG. 2A and FIG. 2B, a light-shielding layer 104 and a color resistance layer 108 are formed on a first substrate 102. For example, first, the light-shielding layer 104 may be formed on the first substrate 102, where the formed light-shielding layer 104 may define a plurality of pixel regions 106. Second, the color resistance layer 108 is formed on the first substrate 102, where the step of forming the color resistance layer 108 may be completed by forming a plurality of color resistors 110a, 110b, and 110c, and the plurality of color resistors 110a, 110b, and 110c are respectively disposed in the corresponding pixel regions 106. In FIG. 2C and FIG. 2D, a plurality of first sensing electrodes 112 and a plurality of second sensing electrodes 114, and at least one dummy electrode D are formed on the first substrate 102, where the first sensing electrodes 112, the second sensing electrodes 114, and the dummy electrode D may be formed by patterning a same film layer, for example, may be formed by a same metal layer or a transparent conductive layer through a same photomask manufacturing process. Further, the first sensing electrodes 112, the second sensing electrodes 114, and the dummy electrode D are formed on the light-shielding layer 104, and any two of the first sensing electrodes 112, the second sensing electrodes 114, and the dummy electrode D are electrically insulated from each other, for example, the first sensing electrodes 112 and the second sensing electrodes 114 are electrically insulated from each other. A shape of each of the first sensing electrodes 112 may be different from a shape of each of the second sensing electrodes 114, so as to be used as a transmit electrode Tx and a receive electrode Rx respectively, and the shapes of the electrodes may be as shown in FIG. 1A. Besides, in another variant embodiment, the dummy electrode D may be omitted.

Figure 2E:
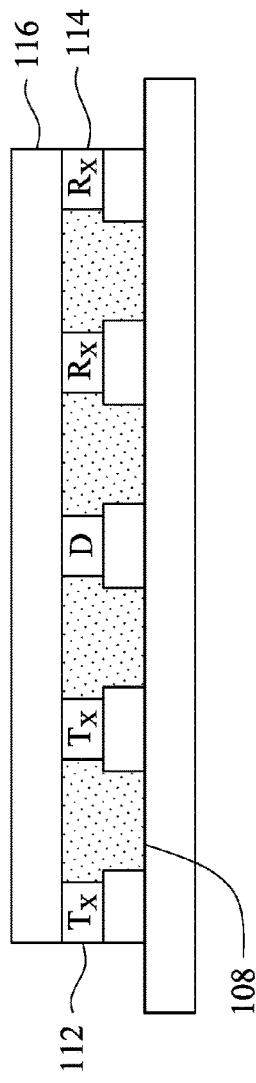
Figure 2F:
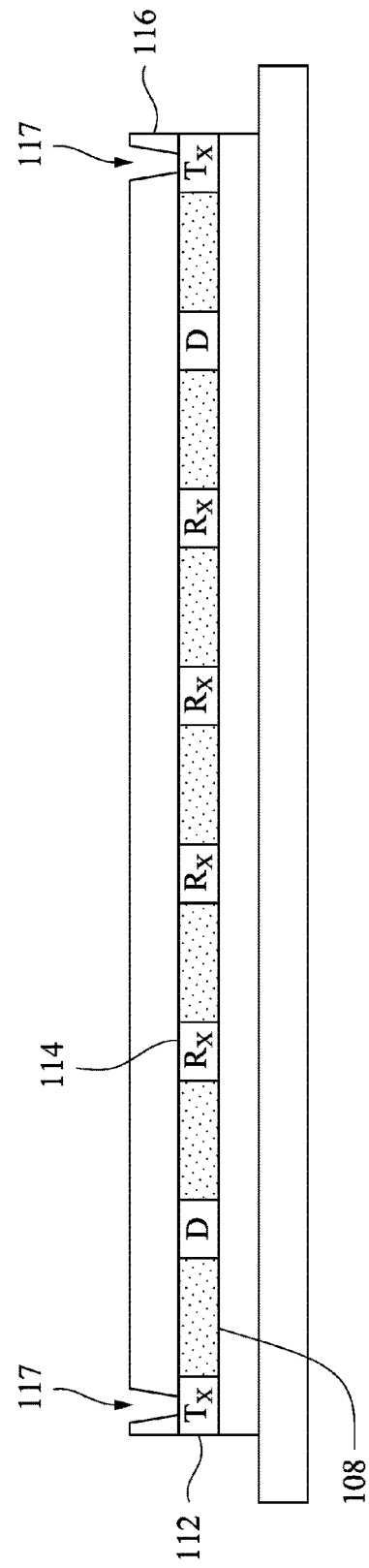

In FIG. 2E and FIG. 2F, a first insulator layer 116 is formed to cover the first sensing electrodes 112, the second sensing electrodes 114, and the color resistance layer 108, and subsequently, a plurality of holes 117 is formed in the first insulator layer 116, where at least a portion of the first sensing electrodes 112 is exposed through the holes 117, and at least one second sensing electrode 114 is located between a pair of formed holes 117. For example, as shown in FIG. 2F, the receive electrodes Rx may be located between a pair of holes 117, and the pair of holes 117 respectively expose different transmit electrodes Tx.

Figure 2G:
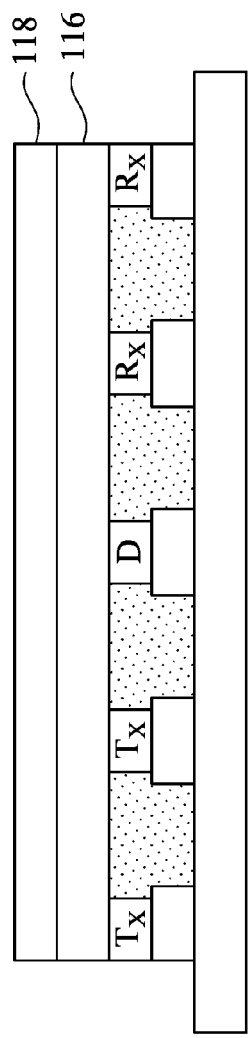
Figure 2H:
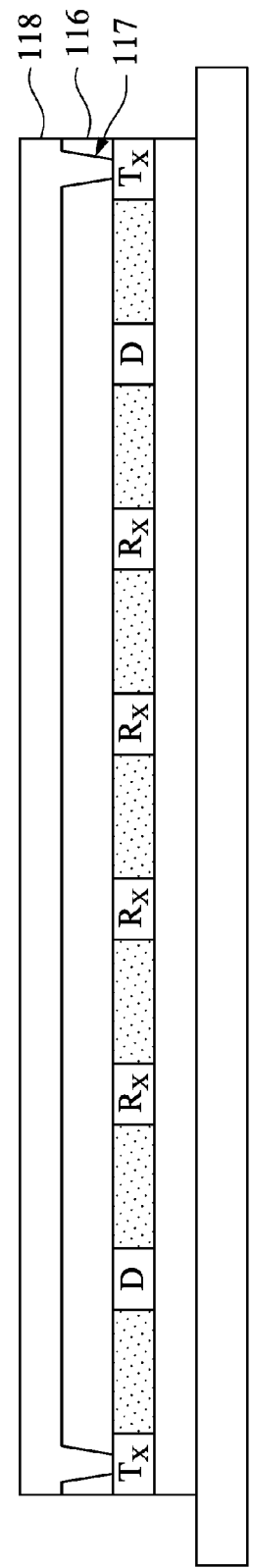

In FIG. 2G and FIG. 2H, a conductive layer 118 is formed on the first insulator layer 116 and in the holes 117, where the conductive layer 118 in the holes 117 may be electrically connected to the corresponding transmit electrodes Tx. The conductive layer 118 may be a metal layer, or may be a transparent conductive layer, for example, may be made of a metal oxide. In FIG. 2I and FIG. 2J, the conductive layer 118 formed in FIG. 2G and FIG. 2H is patterned to form shield electrodes 122 and bridge electrodes 120, as shown in FIG. 2I and FIG. 2J respectively, where the shield electrodes 122 are not electrically connected to the bridge electrodes 120, in other words, the shield electrodes 122 are electrically insulated from the bridge electrodes 120.

After the shield electrodes 122 are formed, a vertical projection of at least a portion of the first sensing electrodes 112 on the first substrate 102 falls within vertical projections of the formed shield electrodes 122 on the first substrate 102, and a vertical projection of at least a portion of the second sensing electrodes 114 on the first substrate 102 also falls within the vertical projections of the formed shield electrodes 122 on the first substrate 102. On the other hand, the formed bridge electrodes 120 are electrically connected to the corresponding first sensing electrodes 112 through the holes 117, where the bridge electrodes 120 are electrically connected to the first sensing electrodes 112 at two sides of the second sensing electrodes 114 by means of bridging.

In FIG. 2K and FIG. 2L, a second insulator layer 124 is formed to cover the shield electrodes 122 and the bridge electrodes 120. The shield electrodes 122 and the bridge electrodes 120 are formed by the same conductive layer 118 (see FIG. 2G and FIG. 2H), and therefore have a same relative location with respect to another layer structure. For example, for each of the shield electrodes 122, the shield electrode 122 has a lower surface and an upper surface respectively in contact with the first insulator layer 116 and the second insulator layer 124, and for each of the bridge electrodes 120, the bridge electrode 120 also has a lower surface and an upper surface respectively in contact with the first insulator layer 116 and the second insulator layer 124, where the lower surface of the shield electrode 122 and the lower surface of the bridge electrode 120 are substantially located at a same horizontal plane, and the upper surface of the shield electrode 122 and the upper surface of the bridge electrode 120 are substantially located at a same horizontal plane. After the step of FIG. 2K and FIG. 2L is completed, a spacer structure is further formed on the second insulator layer 124, and a liquid crystal material is provided, so as to form a liquid crystal layer. Subsequently, the first substrate 102 and the structures thereon are joined with the second substrate 130, so as to complete the structure of the touch panel 100A shown in FIG. 1B and FIG. 1C.

In this embodiment, by means of the foregoing manufacturing method, the bridge electrodes and the shield electrodes of the touch panel may be manufactured in a same photomask manufacturing process, such that the manufacturing process of the touch panel does not need an additional photomask manufacturing process for the manufacturing of the shield electrodes. Therefore, in the method for manufacturing the touch panel, the structure of the touch panel allows the shield electrodes for reducing parasitic capacitance to be formed in the touch panel without increasing complexity of the manufacturing process.

Besides, in this embodiment, although the step of forming the color resistance layer is before the step of forming the first sensing electrodes and the second sensing electrodes, in another embodiment, a step of forming a color resistance layer may be flexibly adjusted. For example, the step of forming a color resistance layer may be after the step of forming first sensing electrodes and second sensing electrodes, or the step of forming a color resistance layer may be after the step of patterning a conductive layer.

On the other hand, in this embodiment, although the color resistance layer, the first insulator layer, and the second insulator layer are three independent layers of structures, in another embodiment, a first insulator layer or a second insulator layer may be replaced by a color resistance layer. For example, a color resistance layer may be formed after a step of forming first sensing electrodes and second sensing electrodes, and the formed color resistance layer covers the first sensing electrodes and the second sensing electrodes, so as to enable the color resistance layer to become an insulator layer and to replace an original first insulator layer. Alternatively, a color resistance layer may be formed after a step of forming a bridge electrode and a shield electrode, and the formed color resistance layer covers the bridge electrode and the shield electrode, so as to enable the color resistance layer to become an insulator layer and to replace an original second insulator layer.

Figure 3:
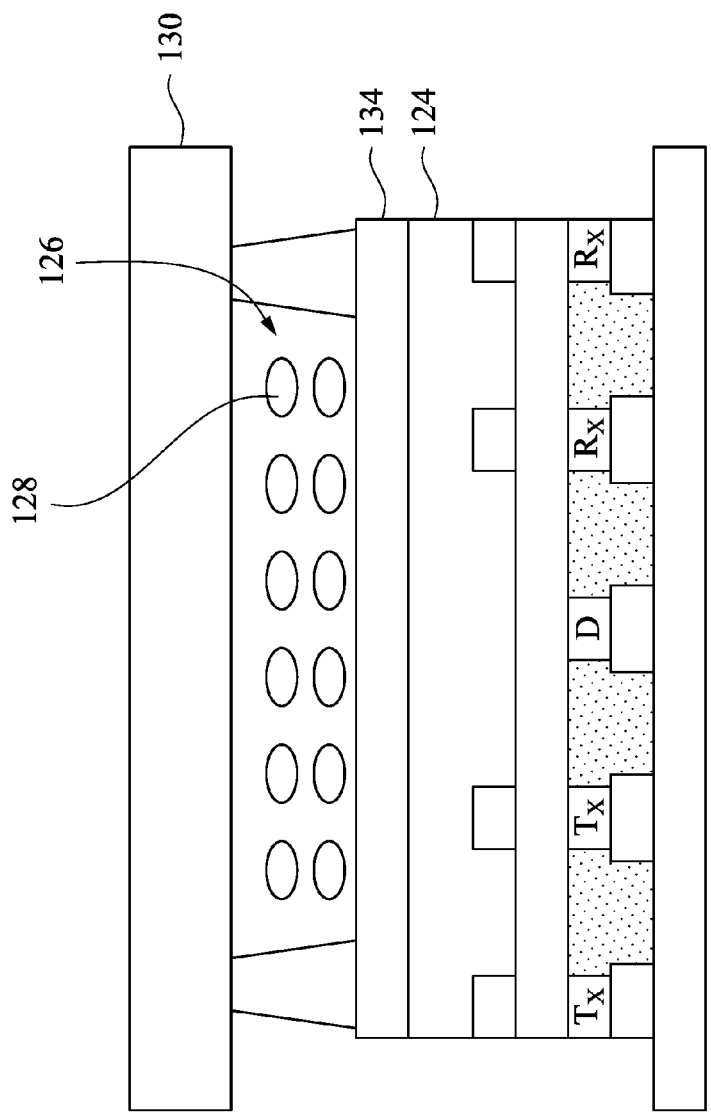
FIG. 3 shows a sectional view of a touch panel according to a second embodiment of the present invention, where the location of sectional view is the same as that of FIG. 1B.

Referring to FIG. 3, FIG. 3 shows a sectional view of a touch panel 100B of a second embodiment of the present invention, where the location of the section is the same as that of FIG. 1B. This embodiment differs from the first embodiment at least in that: the touch panel 100B of this embodiment further includes an electrode layer 134, where the electrode layer 134 is disposed on the second insulator layer 124, and is located between the second insulator layer 124 and the liquid crystal layer 126. In a method for manufacturing the touch panel 100B of this embodiment, a step of forming the electrode layer 134 is after the step of the second insulator layer 124, and the subsequent manufacturing process is similar to that in the first embodiment, and details are not described herein again. The electrode layer 134 may function together with the second substrate 130 to control the liquid crystal material 128 in the liquid crystal layer 126. However, a person of ordinary skill in the art may flexibly select, according to properties of the designed touch panel 100B, whether to form and arrange the electrode layer 134.

Figure 4:
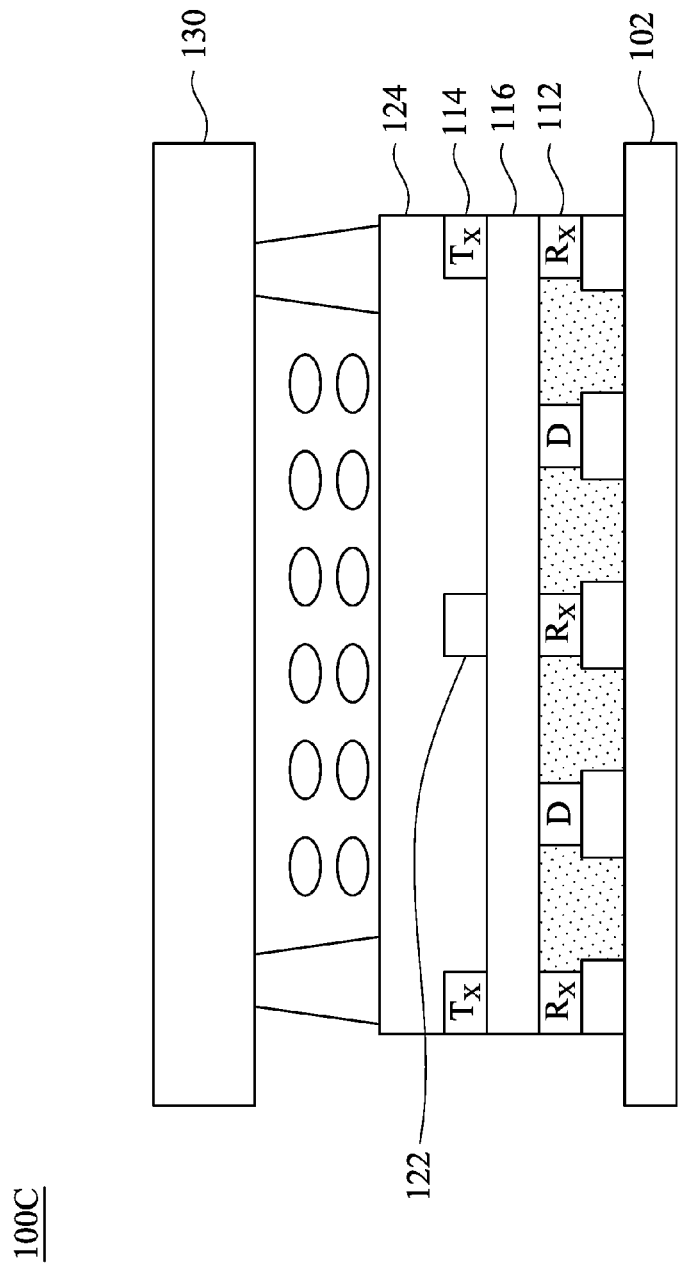
FIG. 4 shows a sectional view of a touch panel according to a third embodiment of the present invention, where the location of sectional view is the same as that of FIG. 1B.

Referring to FIG. 4, FIG. 4 shows a sectional view of a touch panel 100C according to a third embodiment of the present invention, where the location of the section is the same as that of FIG. 1B. This embodiment differs from the first embodiment at least in that the first sensing electrodes 112 of this embodiment are receive electrodes Rx, and the second sensing electrodes 114 are transmit electrodes Tx, where the first sensing electrodes 112 functioning as the receive electrodes Rx and the second sensing electrodes 114 functioning as the transmit electrodes Tx are respectively located at two opposite sides of the first insulator layer 116. Besides, the shield electrodes 122 and the first sensing electrodes 112 are respectively located at two opposite sides of the first insulator layer 116. The shield electrodes 122 and the second sensing electrodes 114 are located at a same side of the first insulator layer 116.

Further, the first sensing electrodes 112 and the dummy electrodes D may be disposed between the first insulator layer 116 and the first substrate 102, and the first insulator layer 116 covers the first sensing electrodes 112 and the dummy electrodes D. The second sensing electrodes 114 and the shield electrodes 122 are disposed on the first insulator layer 116, where vertical projections of the shield electrodes 122 on the first substrate 102 at least partially overlap with vertical projections of the first sensing electrodes 112 on the first substrate 102. Further, a vertical projection of at least a portion of the first sensing electrodes 112 on the first substrate 102 falls within the vertical projections of the shield electrodes 122 on the first substrate 102.

In a configuration relationship between the second sensing electrodes 114 and the shield electrodes 122 of this embodiment, the second sensing electrodes 114 and the shield electrodes 122 may be formed by a same film layer, that is, the second sensing electrodes 114 and the shield electrodes 122 may be made of a same material, and each second sensing electrode 114 may have a thickness the same as a thickness of each shield electrode 122. Besides, the second sensing electrodes 114 and the shield electrodes 122 are in contact with a same surface of the first insulator layer 116. For example, the second sensing electrodes 114 and the shield electrodes 122 are in contact with an upper surface of the first insulator layer 116, where the upper surface of the first insulator layer 116 is opposite to the first substrate 102. Further, lower surfaces of the second sensing electrodes 114 and lower surfaces of the shield electrodes 122 are in contact with the upper surface of the first insulator layer 116, and the lower surfaces of the second sensing electrodes 114 and the lower surfaces of the shield electrodes 122 are substantially located at a same horizontal plane.

Likewise, the second sensing electrodes 114 and the shield electrodes 122 are in contact with a same surface of the second insulator layer 124, for example, the second sensing electrodes 114 and the shield electrodes 122 are in contact with a lower surface of the second insulator layer 124, where the lower surface of the second insulator layer 124 faces the first substrate 102. Further, upper surfaces of the second sensing electrodes 114 and upper surfaces of the shield electrodes 122 are in contact with the lower surface of the second insulator layer 124, and the upper surfaces of the second sensing electrodes 114 and the upper surfaces of the shield electrodes 122 are substantially located at a same horizontal plane.

By means of the foregoing configuration, the shield electrodes 122 are located between at least a portion of the first sensing electrodes 112 and the second substrate 130, and the vertical projection of the at least a portion of the first sensing electrodes 112 on the first substrate 102 falls within the vertical projections of the shield electrodes 122 on the first substrate 102, such that the shield electrodes 122 can prevent the first sensing electrodes 112 form being subjected to interference from a side of the second substrate 130, and can reduce parasitic capacitance generated between the first sensing electrodes 112 and the second substrate 130.

On the other hand, the second sensing electrodes 114 and the shield electrodes 122 may be formed by a same film layer, and therefore, the structure of this embodiment also allows the shield electrodes 122 for reducing parasitic capacitance to be formed in the structure without increasing complexity of a manufacturing process. A manufacturing process of the touch panel 100C of this embodiment is further described below.

Referring to FIG. 5A to FIG. 5F, FIG. 5A, FIG. 5C, and FIG. 5E show sectional views of the touch panel 100C of FIG. 4 at different stages of a manufacturing process, where the location of the section is the same as that of FIG. 1B, and FIG. 5B, FIG. 5D, and FIG. 5F show sectional views of the touch panel 100C of FIG. 4 at the different stages of the manufacturing process, where the location of the section is the same as that of FIG. 1B. Besides, a step of forming the light-shielding layer 104 and a step of forming the color resistance layer 108 of this embodiment are the same as those of the first embodiment, and details about the same steps are not described herein again.

Figure 5A:
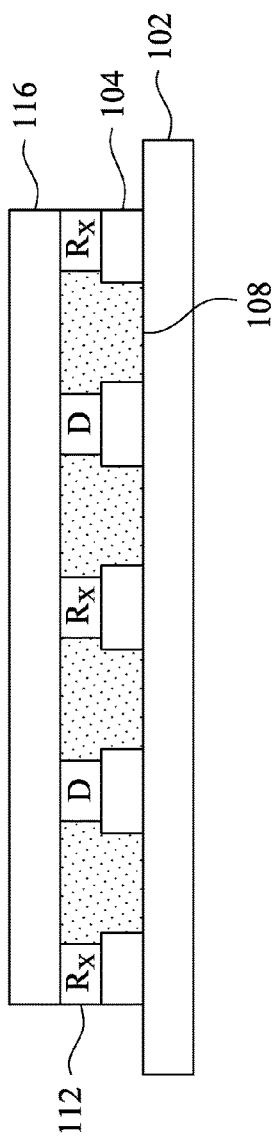
FIG. 5A, FIG. 5C, and FIG. 5E show sectional views of the touch panel of FIG. 4 at different steps of a manufacturing process, where the location of sectional view is the same as that of FIG. 1B.
Figure 5B:
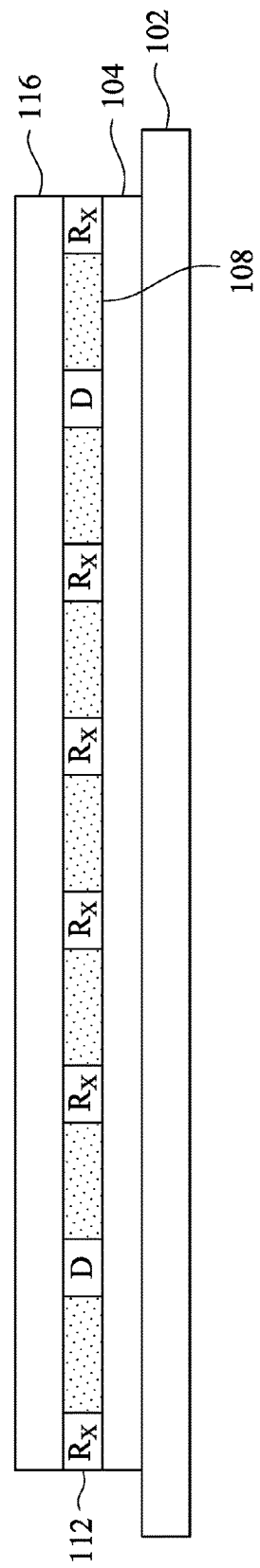
FIG. 5B, FIG. 5D, and FIG. 5F show sectional views of the touch panel of FIG. 4 at the different steps of the manufacturing process, where the location of sectional view is the same as that of FIG. 1C.

In FIG. 5A and FIG. 5B, a plurality of first sensing electrodes 112 and at least one dummy electrode D are formed on the first substrate 102, where the first sensing electrodes 112 and the dummy electrode D may be formed by a same film layer. Further, the first sensing electrodes 112 and the dummy electrode D are formed on a light-shielding layer 104, and the first sensing electrodes 112 are electrically insulated from the dummy electrode D. Besides, the first sensing electrodes 112 may function as receive electrodes Rx. In another embodiment, the dummy electrode D may be omitted. After the step of forming the first sensing electrodes 112 and the dummy electrode D is conducted, form a first insulator layer 116, where the first insulator layer 116 covers the first sensing electrodes 112 and the dummy electrode D. Subsequently, in FIG. 5C and FIG. 5D, after the step of forming the first insulator layer 116, form a conductive layer 118 on the first insulator layer 116. The conductive layer 118 may be a metal layer, or may be a transparent conductive layer, for example, may be made of a metal oxide.

Figure 5C:
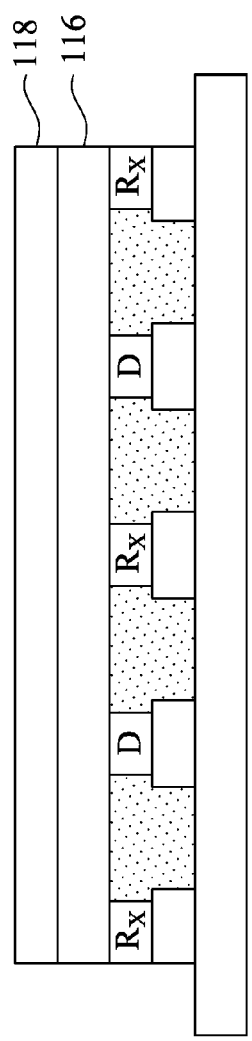
Figure 5D:
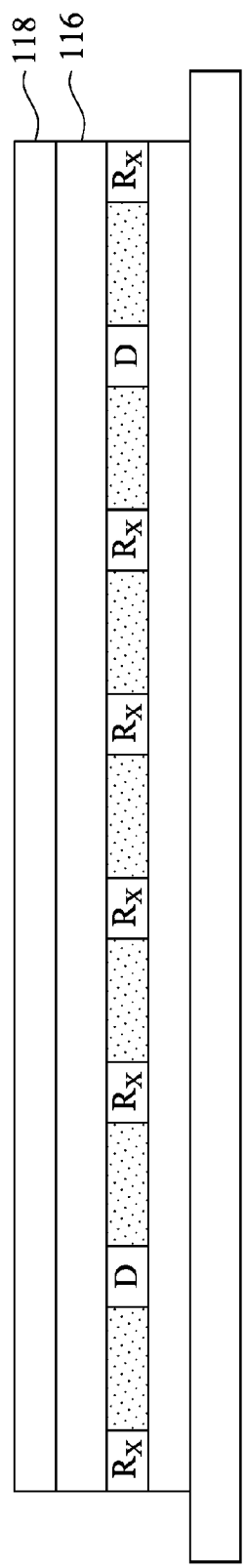
Figure 5E:
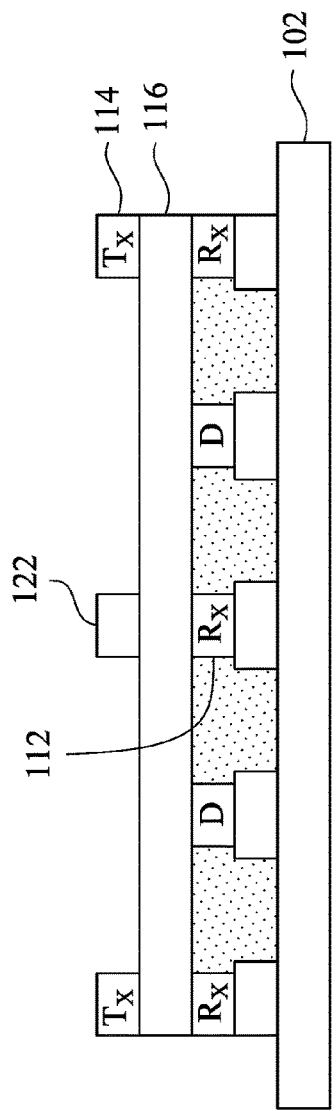
Figure 5F:
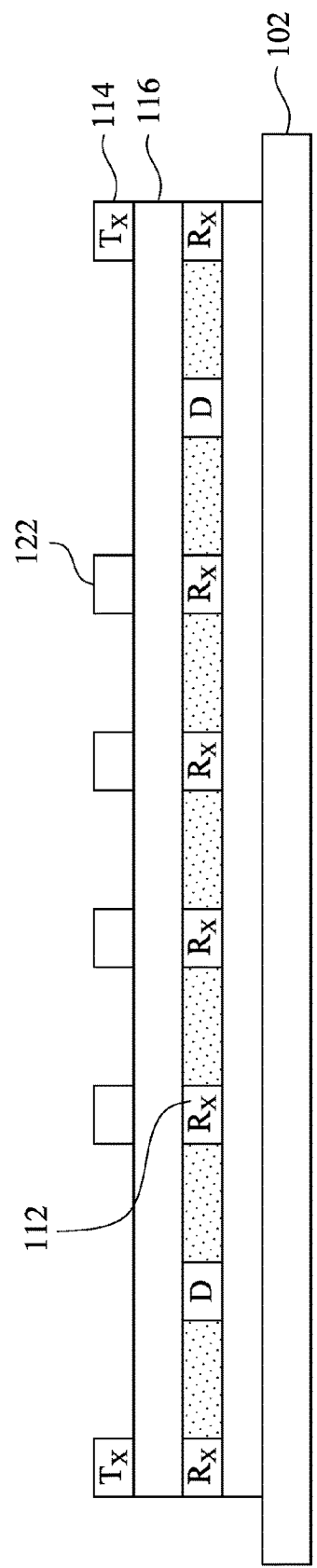

In FIG. 5E and FIG. 5F, the conductive layer 118 formed in FIG. 5C and FIG. 5D is patterned to form second sensing electrodes 114 and shield electrodes 122, where the second sensing electrodes 114 may function as transmit electrodes Tx. The second sensing electrodes 114 are not electrically connected to the shield electrodes 122, in other words, the second sensing electrodes 114 are electrically insulated from the shield electrodes 122. When the second sensing electrodes 114 and the shield electrodes 122 are formed, vertical projections of the shield electrodes 122 on the first substrate 102 at least partially overlap with vertical projections of the first sensing electrodes 112 on the first substrate 102. Further, a vertical projection of at least a portion of the first sensing electrodes 112 on the first substrate 102 falls within the vertical projections of the shield electrodes 122 on the first substrate 102. After the step according to FIG. 5E and FIG. 5F is completed, the same as the first embodiment, a second insulator layer, a spacer structure, and a liquid crystal layer are formed, and subsequently, the first substrate 102 and the structures thereon are joined with the second substrate 130, so as to complete the structure of the touch panel 100C shown in FIG. 4.

In this embodiment, by means of the foregoing manufacturing method, the second sensing electrodes and the shield electrodes of the touch panel may be manufactured in a same photomask manufacturing process, and therefore, in the method for manufacturing the touch panel, the structure of the touch panel allows the shield electrodes for reducing parasitic capacitance to be formed in the touch panel without increasing complexity of the manufacturing process. Besides, a sequence of the step of forming a color resistance layer may be flexibly adjusted, which is illustrated in the first embodiment, and details are not described herein again. On the other hand, also like the first embodiment, in this embodiment, the first insulator layer or the second insulator layer may be replaced by the color resistance layer, and details are not described herein again.

Figure 6:
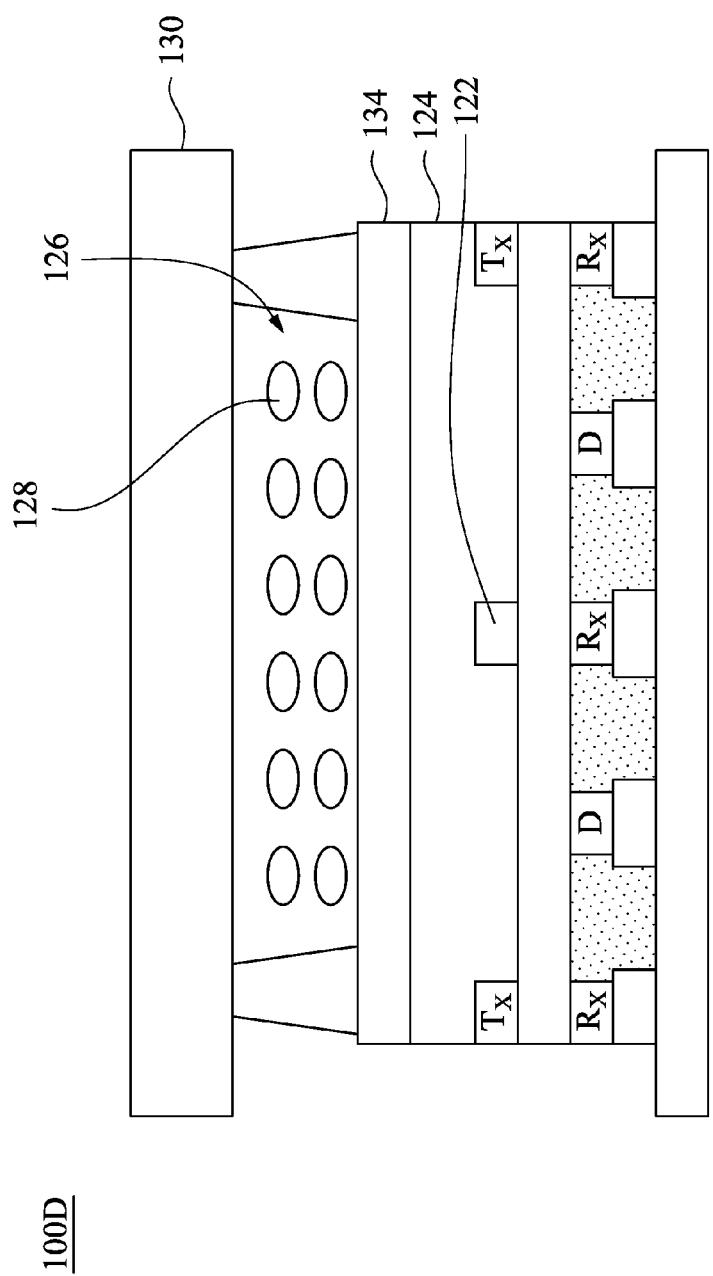
FIG. 6 shows a sectional view of a touch panel according to a fourth embodiment of the present invention, where the location of sectional view is the same as that of FIG. 4.

Referring to FIG. 6, FIG. 6 shows a sectional view of a touch panel 100D according to a fourth embodiment of the present invention, where the location of the section is the same as that of FIG. 4. This embodiment differs from the third embodiment at least in that: the touch panel 100D of this embodiment further includes an electrode layer 134, where the electrode layer 134 is disposed on the second insulator layer 124, and is located between the second insulator layer 124 and the liquid crystal layer 126. In a method for manufacturing the touch panel 100D of this embodiment, a step of forming the electrode layer 134 is after the step of forming the second insulator layer 124, and the subsequent manufacturing process is similar to that in the first embodiment, and details are not described herein again. The electrode layer 134 may function together with the second substrate 130 to control the liquid crystal material 128 in the liquid crystal layer 126. However, a person of ordinary skill in the art may flexibly select, according to properties of the designed touch panel 100D, whether to form and arrange the electrode layer 134.

To sum up, in a structure of the touch panel of at least one of the embodiments of the present invention, the shield electrodes may be located between the sensing electrodes and the second substrate, and the vertical projections of the shield electrodes on the first substrate at least partially overlap with the vertical projections of the sensing electrodes on the first substrate, such that the shield electrodes can prevent the sensing electrodes from being subjected to interference from a side of the second substrate, and can reduce parasitic capacitance generated between the sensing electrodes and the second substrate.

Besides, by means of the method for manufacturing a touch panel of at least one of the embodiments of the present invention, the shield electrodes and the bridge electrodes or the sensing electrodes of the touch panel may be manufactured in a same photomask manufacturing process, such that a manufacturing process of the touch panel does not need an additional photomask manufacturing process for the manufacturing of the shield electrodes, and the shield electrodes are formed in the touch panel without increasing complexity of the manufacturing process.

Although the present invention is described above by means of a plurality of embodiments, the above description is not intended to limit the present invention. A person skilled in the art may make various variations and modifications without departing from the spirit and scope of the present invention. Therefore, the protection scope of the present invention is as defined by the appended claims.

What is claimed is:

1. A touch panel, comprising:
a first substrate;
a first touch sensing electrode, disposed above the first substrate;

a second touch sensing electrode, disposed above the first substrate and separated from said first touch sensing electrode;

a first insulator layer, disposed above said first touch sensing electrode and said second touch sensing electrode;

a first shield electrode, electrically grounded and disposed above said first insulator layer aligned with first touch sensing electrode;

a second shield electrode, electrically grounded, disposed above said first insulator layer aligned with second touch sensing electrode, and separated from said first shield electrode;

a second insulator layer, disposed above said first shield electrode and said second shield electrode; and a display electrode layer, disposed above said second insulator layer;

wherein a vertical projection of the first sensing electrode on the display electrode layer lies entirely within a vertical projection of the first shield electrode on the display electrode layer, and a vertical projection of the second sensing electrode on the display electrode layer lies entirely within a vertical projection of the second shield electrode on the display electrode layer.

2. The touch panel according to claim 1, further comprising:

a third touch sensing electrode, disposed above the first substrate; and a bridge electrode, disposed above said first insulator layer separated from said first shield electrode and said second shield electrode;

wherein said bridge electrode electrically connects to said first touch sensing electrode to said third touch sensing electrode though holes in the first insulator layer.

3. The touch panel according to claim 1, further comprising:

a light shielding layer, comprising:
light shielding portions, defining pixel regions;

wherein said vertical projection of the first sensing electrode on the display electrode layer lies entirely within a vertical projection of a first light shielding portion of said light shielding portions on the display electrode layer, and said vertical projection of the second sensing electrode on the display electrode layer lies entirely within a vertical projection of a second light shielding portion of said light shielding portions on the display electrode layer.

4. The touch panel according to claim 3, further comprising:

a third touch sensing electrode, disposed above the first substrate;

a bridge electrode, disposed above said first insulator layer separated from said first shield electrode and said second shield electrode;

wherein said bridge electrode electrically connects to said first touch sensing electrode to said third touch sensing electrode though holes in the first insulator layer.

5. The touch panel according to claim 4, further comprising:

a dummy electrode, disposed on a third light shielding portion of said light shielding portions, wherein a vertical projection of the dummy electrode on the display electrode layer lies entirely within a vertical projection of the third light shielding portion of said light shielding portions on the display electrode layer.

* * * * *